June 12, 1923.
F. E. HARRIS
AIR BRAKE VALVE
Filed May 17, 1921
1,458,882
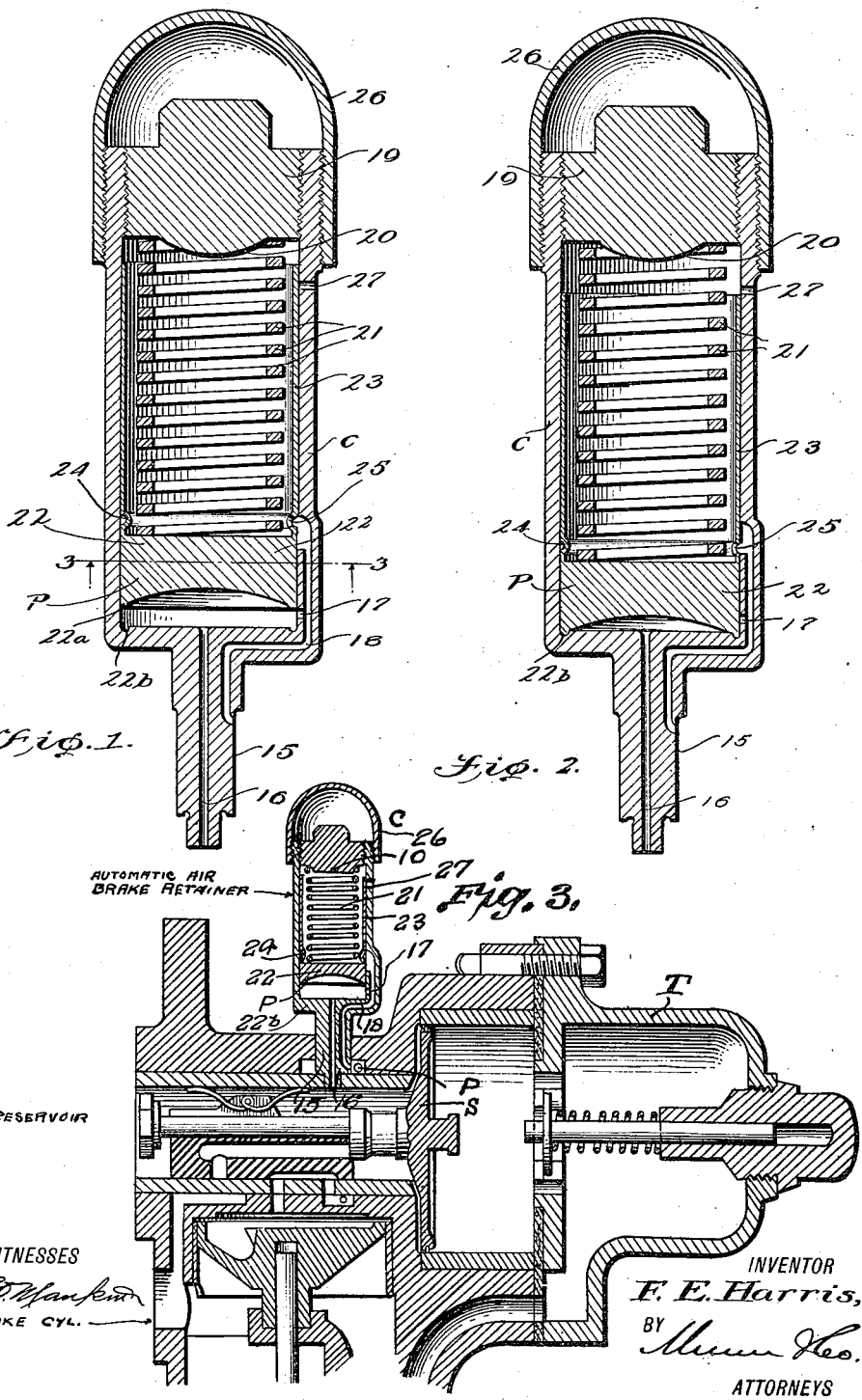
WITNESSES
INVENTOR
F. E. Harris,
BY
ATTORNEYS Patented June 12, 1923.

1,458,882

UNITED STATES PATENT OFFICE.

FRANK EMERON HARRIS, OF LARAMIE, WYOMING.

AIR-BRAKE VALVE.

Application filed May 17, 1921. Serial No. 470,421.

*To all whom it may concern:*

Be it known that I, FRANK EMERON HARRIS, a citizen of the United States, and a resident of Laramie, in the county of Albany and State of Wyoming, have invented certain new and useful Improvements in Air-Brake Valves, of which the following is a specification.

My invention relates to air brake systems, and the purpose of my invention is the provision of a valve therefor adapted to be interposed between the triple valve and brake cylinder for controlling the passage of air to and from the brake cylinder in accordance with the pressure of air in the train line.

I will describe one form of air brake valve embodying my invention and will then point out the novel features thereof in claims.

In the accompanying drawings:

Figure 1 is a view showing in vertical section one form of air brake valve embodying my invention.

Figure 2 is a view similar to Figure 1 showing the valve in closed position.

Figure 3 is a fragmentary sectional view of a triple valve showing the valve of the present invention applied and in longitudinal section.

Similar reference characters refer to similar parts in each of the several views.

Referring specifically to the drawings, my invention in its present embodiment comprises a cylinder designated at C one end of which is closed and provided with a depending extension 15 formed with a duct 16 co-extensive in length with the extension and communicating with the cylinder. The free end of the extension 15 is screw threaded exteriorly to permit of its association with a triple valve of standard form from which latter air is supplied to the cylinder through the duct 16. Adjacent the lower end of the cylinder, a port 17 is provided which communicates with a duct 18 intermediate the ends of the latter. The duct 18 is formed in the side wall of the cylinder, the bottom wall, and the extension 15 in the manner clearly shown in Figures 1 and 2, with the upper end adapted to communicate with the cylinder at a point above the port 17, and its lower end adapted to communicate with the brake cylinder of an air brake system.

The upper end of the cylinder C is closed by a screw plug 19 threadedly fitted within the cylinder and having its lower side formed with a convex portion 20 which provides a positioning projection for the upper end of a coiled expansible spring 21. The spring 21 is designed for the purpose of normally urging a piston P downwardly toward the lower end of the cylinder, such piston including a head 22 and a sleeve 23 upstanding from and integrally formed with the head and having sliding contact with the wall of the cylinder. As shown in Figures 1 and 2, the lower side of the head 22 is concaved and at the periphery is formed with an annular bead $22^a$ which in the lowermost position of the head is adapted to seat within an annular groove $22^b$. Adjacent the juncture of the head 22 and the sleeve 23, the latter is bent inwardly to provide an annular groove 24 which communicates with a port 25 formed in the sleeve at such a point that when the piston is in the position shown in Figure 1 it will register with the upper end of the duct 18.

The upper end of the cylinder C threadedly receives a hood or cap 26 which houses the plug 19 and protects the latter from being torn loose from the cylinder. At a point directly beneath the hood, the wall of the cylinder is formed with a port 27 adapted to effect communication between the cylinder and atmosphere when the sleeve 23 is in the lowered position as shown in Figure 2.

The air brake retainer heretofore described may be associated with any type of triple valve so proper connections can be made. The so-called "H-1 quick action freight triple valve" is of the Westinghouse manufacture and particularly suited for the application of the present invention and so illustrated in Figure 3 of the drawings. As shown in Figure 3 the extension 15 of the air brake retainer and cylinder is extended through a suitable opening in the wall of the triple valve which may be generally referred to by the reference character T, so that the duct 16 is in communication with the passage which would lead to the auxiliary air reservoir and its duct 18 in communication with the passage P and in communication with the brake cylinder when the slide valve S is in a certain position. Also the passage P will be brought into communication with the atmosphere or exhaust port of the triple valve when the slide valve S is in its full release position. It is assumed that the precise operation of the triple valve shown is fully understood by those skilled in the art and no further detailed description thereof will be made. The description to follow will relate to the manner in which the automatic air brake retainer valve of the present invention operates for the purposes heretofore mentioned.

As shown in Figure 3 of the drawings the slide valve S is in its released position. The air pressure coming from the train line pipe has been delivered to the auxiliary reservoir and the pressure in the reservoir equal to the train line pipe pressure. The spring 21 may be adjusted by the plug 10 to offer any desired resistance. Assuming that the spring 21 would offer 80 lbs. resistance to compression; then when the pressure from the train line becomes greater than 80 lbs., it will cause the plunger 22 to move upwardly closing port 27 and permitting air to pass through the port 17 into the passage 18 and from thence through port 25 into the chamber containing the spring 21. Air will also escape from the lower end of the passage 18 into the passage P and from thence beneath the slide valve S. If the slide valve S is in its full release position it will permit the air to escape to the atmosphere. If the slide valve is not in its release position the air must proceed to the brake cylinder. Air will continue to flow from the auxiliary reservoir through the brake cylinder until the spring 21 combined with the air pressure therein overcomes the air pressure below the plunger 22 whereupon the plunger 22 will move downwardly closing the port 17. The plunger 22 will however not fully seat but remain in a lap position and still keeping the port 27 closed so that air cannot escape to the atmosphere.

If the brake cylinder is defective on account of leakage the same operation will be repeated as long as the same pressure is maintained in the train line.

By this operation it will be seen that air of a predetermined pressure is automatically supplied to the brake cylinder and that when the air in such cylinder has reached this predetermined pressure a further supply of air to the cylinder is automatically discontinued. By increasing the pressure in the train line, however, it will be clear that the operation of the valve will be repeated and thus increasing the pressure in the brake cylinder in direct proportion to the increase in pressure to the train line.

To discharge the air from the brake cylinder it is necessary that the pressure of air in the train line be reduced below the pressure exerted on the piston head 22 by a spring 21 and air within the chamber occupied by the spring 21. The piston will then be forced to a position shown in Figure 2 thus opening the port 27. If the train line is raised to such a pressure it will cause the slide valve S to come to its release position, the air in the brake cylinder will then be permitted to escape through the exhaust port 27 of the automatic air brake retainer.

By virtue of the plug 19 being threadedly fitted within the upper end of the cylinder C, it will be clear that such plug is adjustable to vary the tension of the spring 21 and consequently the pressure exerted by the latter on the piston head 22. It will therefore be seen that in accordance with the adjustment of the spring 21, the necessary reduction in pressure of air in the train line in order to effect the discharge of air from the brake cylinder can be varied in accordance with the adjustment of the springs.

Although I have herein shown and described only one form of brake valve embodying my invention, it is to be understood that various changes and modifications may be made herein without departing from the spirit of the invention and the spirit and scope of the appended claims.

What I claim is:

1. In an air brake apparatus of the character described, including a triple valve, an auxiliary reservoir and a brake cylinder, in combination, a valve connected with the exhaust of said triple valve and adapted to establish an axhaust for said triple valve when the triple valve is in its released position and also adapted to establish communication with the auxiliary reservoir and the brake cylinder upon the pressure within the auxiliary reservoir reaching a predetermined degree.

2. A brake valve of the character described comprising a cylinder having one end thereof closed and provided with an extension, a duct formed in the extension, a second duct formed in the extension with one end terminating in the cylinder and the other end terminating exteriorly of the cylinder, a port formed in the cylinder adjacent its closed end and having communication between the cylinder and the second duct; a piston working within the cylinder and including a head movable to control said port, and a sleeve on and movable with the head, a port formed in the sleeve and adapted to register with the upper end of the second duct, a second port formed in said cylinder and controlled by said sleeve, a plug adjustably fitted in the open end of the cylinder, and an expansible spring within said sleeve and between said plug and head for urging the latter downwardly of the cylinder.

3. In an air brake system of the character described, including a triple valve adapted to be connected with an air pressure pipe, an auxiliary reservoir and a brake cylinder, in combination; a valve associated with the exhaust of the triple valve and adapted to open the same when the triple valve has resumed its brake release position and also adapted to establish communication between the auxiliary air reservoir and the brake cylinder during the interval that the pipe pressure is above that necessary for fully charging said auxiliary reservoir.

4. An air brake valve comprising a cylinder, ducts communicating with the cylinder, ports in the cylinder for effecting communication between the ducts and cylinder and connecting the cylinder to atmosphere, a piston within the cylinder and comprising a head for controlling one of the ports and a sleeve for controlling another of the ports, a port formed in the sleeve and adapted to register with one of the ducts, and a spring engageable with the head for normally urging the latter to a predetermined position within the cylinder.

5. An air brake valve comprising a cylinder, ducts communicating with the cylinder, ports in the cylinder for effecting communication between the ducts and cylinder and connecting the cylinder to atmosphere, a piston within the cylinder and comprising a head for controlling one of the ports and a sleeve for controlling another of the ports, a port formed in the sleeve and adapted to register with one of the ducts, a spring engageable with the head for normally urging the latter to a predetermined position within the cylinder, and means for adjusting the tension of the spring to vary the pressure exerted on said head for the purpose described.

6. A brake valve governor of the character described, comprising a cylinder having one end thereof closed and provided with an extension, said extension having a central longitudinally extending bore and a duct, said duct terminating at its one end in the cylinder and its other end exteriorly of the cylinder, said cylinder also having a port adjacent its closed end which communicates with the duct, a piston working within the cylinder and including a head movable to control the port, and a sleeve extension from said head formed with a port adapted to be brought into register with the upper end of the duct, and said cylinder having its other end with relation to the extension formed with a second port adapted to be controlled by said sleeve, a plug adjustably fitted in the upper end of the last named end of the cylinder, and an expansible spring interposed between said plug and said head and disposed within said sleeve.

FRANK EMERON HARRIS.